INVENTOR.
ELTON T. BARRETT
BY
Curtis, Morris & Safford
ATTORNEYS

INVENTOR.
ELTON T. BARRETT
BY
Curtis, Morris & Safford
ATTORNEYS

INVENTOR.
ELTON T. BARRETT
BY
Curtis, Morris & Safford
ATTORNEYS

INVENTOR.
ELTON T. BARRETT

BY
Curtis, Morris & Safford
ATTORNEYS

INVENTOR.
ELTON T. BARRETT
BY
Carter, Morris & Safford
ATTORNEYS

INVENTOR.
ELTON T. BARRETT
BY
Curtis, Morris & Safford
ATTORNEYS

INVENTOR.
ELTON T. BARRETT

BY

Curtis, Morris & Safford
ATTORNEYS

INVENTOR.
ELTON T. BARRETT
BY
Curtis, Morris & Safford
ATTORNEYS 3,615,093
CHANCE INDICATOR WITH DRIVE HAVING EFFECTIVELY DISSIMILAR CAMS

Elton T. Barrett, 40234 Marcella Lane, Hemet, Calif. 92343

Continuation of application Ser. No. 658,274, Aug. 3, 1967. This application Dec. 3, 1969, Ser. No. 876,173
Int. Cl. A63b *71/00;* A63f *1/18*
U.S. Cl. 273—143 R 5 Claims

ABSTRACT OF THE DISCLOSURE

In an electrically operated market game, having windows or other means for selecting particular indicia displayed on a plurality of motor driven fluctuating dials rotatably mounted on a shaft and driven by means of a drive mechanism having parallel shafts, each having at least one eccentric cam, a drive chain or other flexible tensile member attached to a base and drawn around the eccentric cam on each shaft and attached to a respective dial so that when the cams turn so as to increase or decrease their radii, the chain is pulled or slackened and the dials move; and a spring return mechanism which pulls the dials back against the chain to take up slack.

This application is a continuation of application Ser. No. 658,274, filed Aug. 3, 1967, now abandoned.

This invention relates to amusement games and in particular to electrically operated games. The present invention is described as embodied in a stock market game in which the players engage in buying and selling of stocks and commodities in a manner that simulates actual stock market transactions.

It is an object of the present invention to provide an educational game which retains the interest of players over a long period of time.

Another object of the present invention is to provide a mechanism which introduces into a game an element of chance which modifies the effectiveness of players' skill.

Still another object of the present invention is to provide a game mechanism which automatically and cyclically but unpredictably varies the value of players' "property."

Other objects and advantages of the present invention will be more readily apparent upon a consideration of the following detailed description of the illustrative embodiments of the invention, taken in conjunction with the appended drawings in which.

Figure 1:
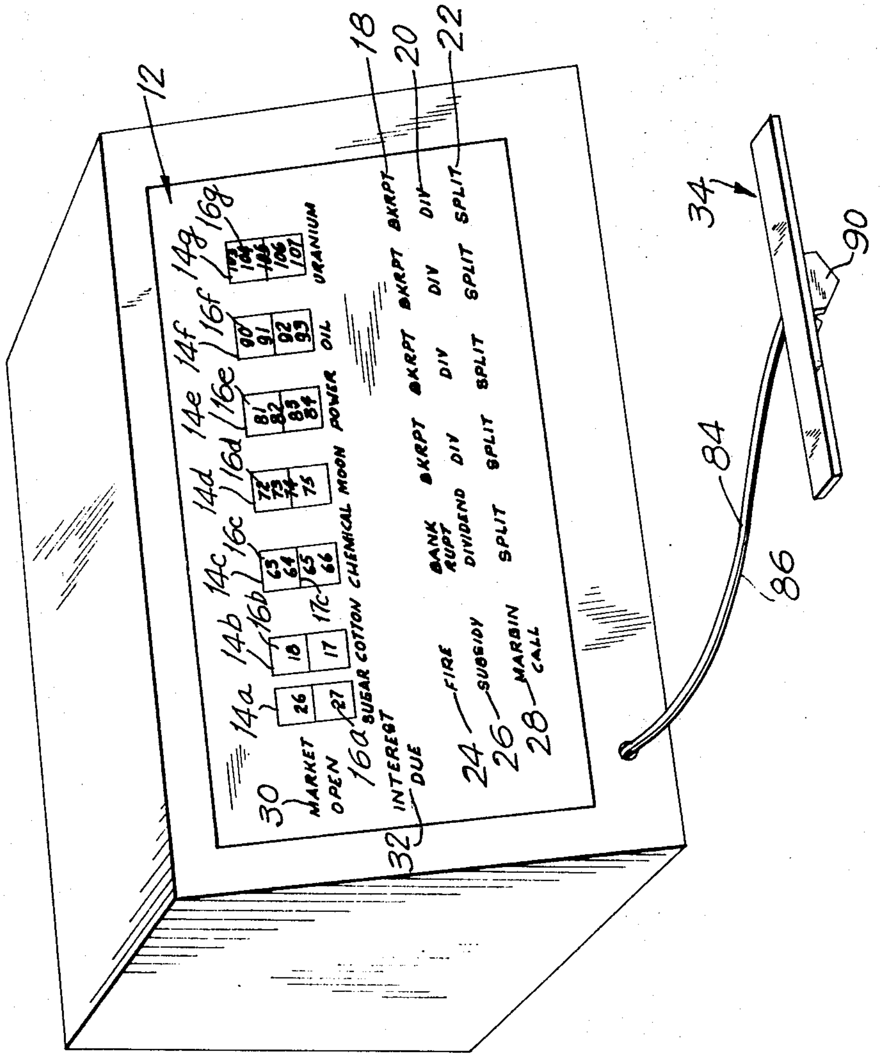
FIG. 1 is a perspective view of a game embodying the invention showing the front panel and a table switch.
Figure 2:
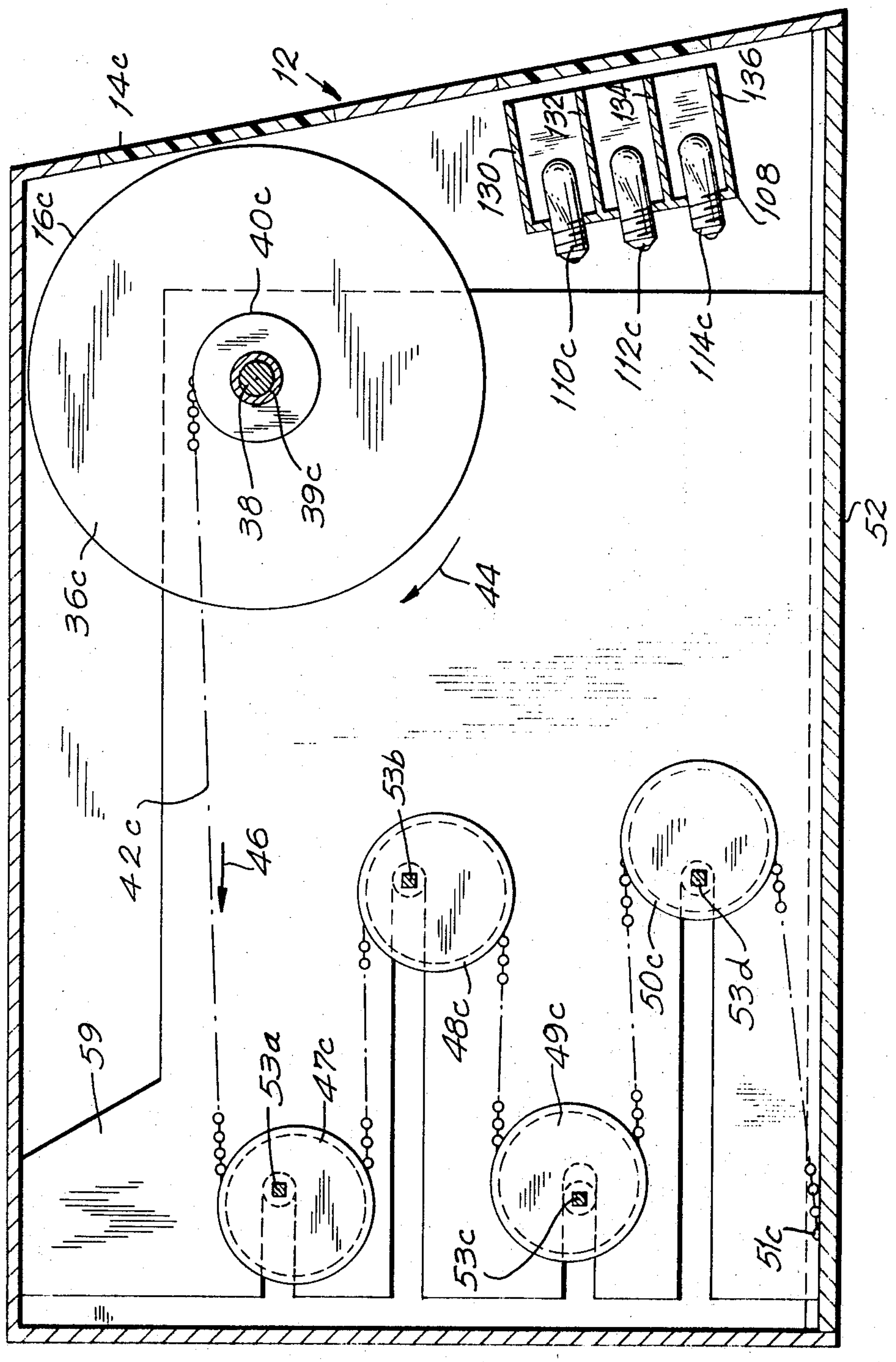
FIG. 2 is a diagrammatic sectional view as though taken on line 2—2 of FIG. 4 showing a cam arrangement for operating the dials.
Figures 3, 3A:
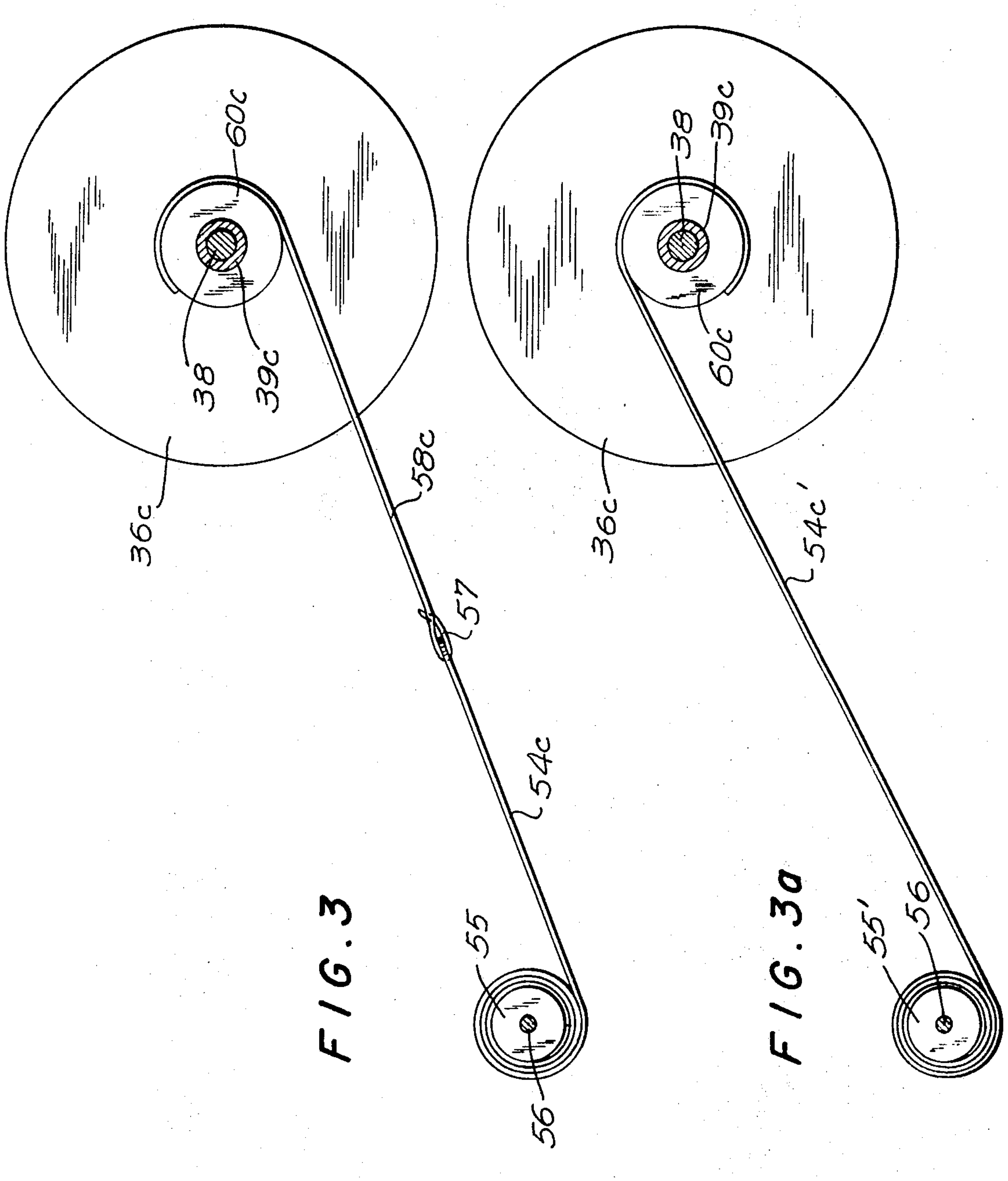
FIG. 3 is a diagrammatic sectional view as though taken on line 3—3 of FIG. 4 showing a spring bias for the dials.
Figure 4:
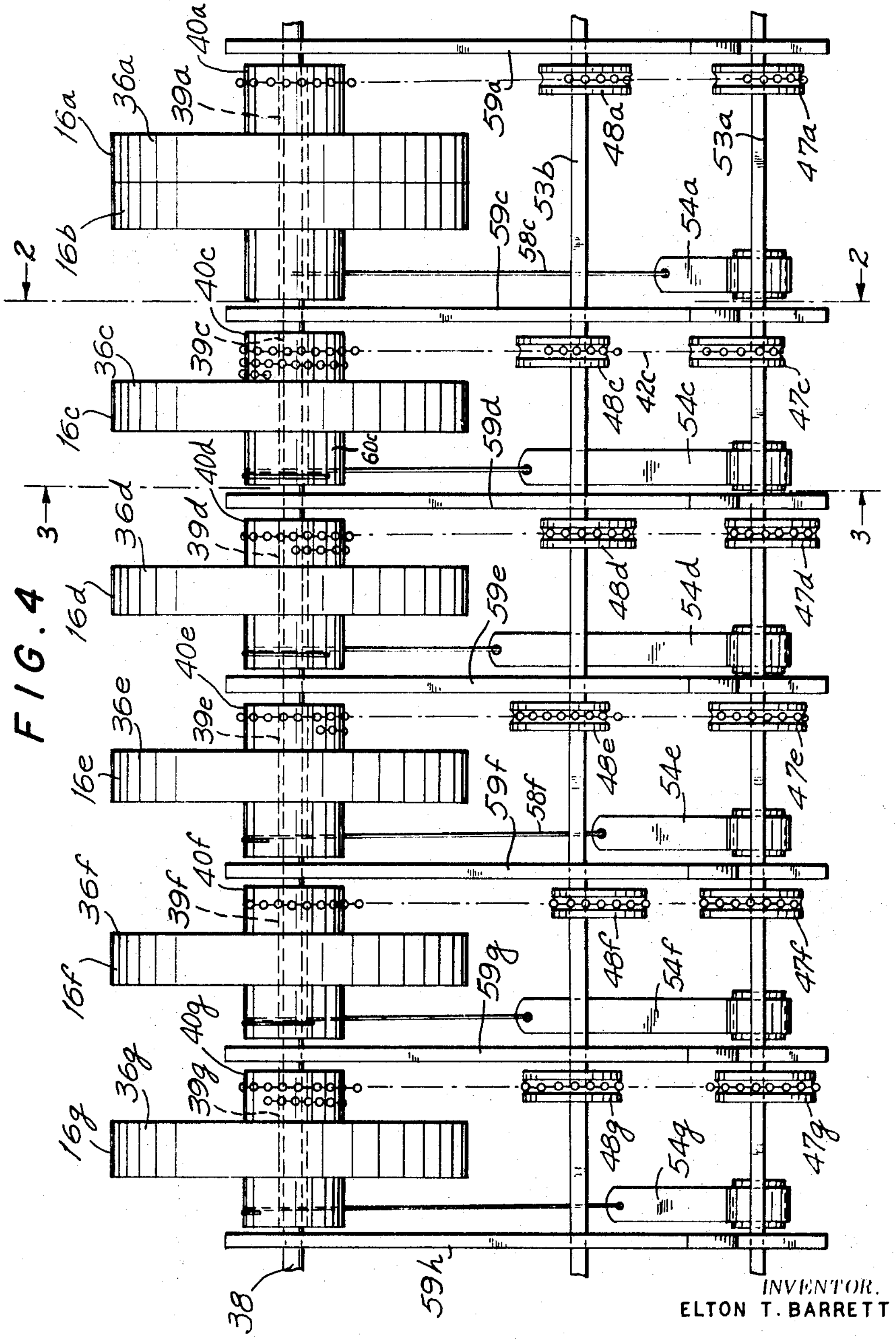
Figure 5:
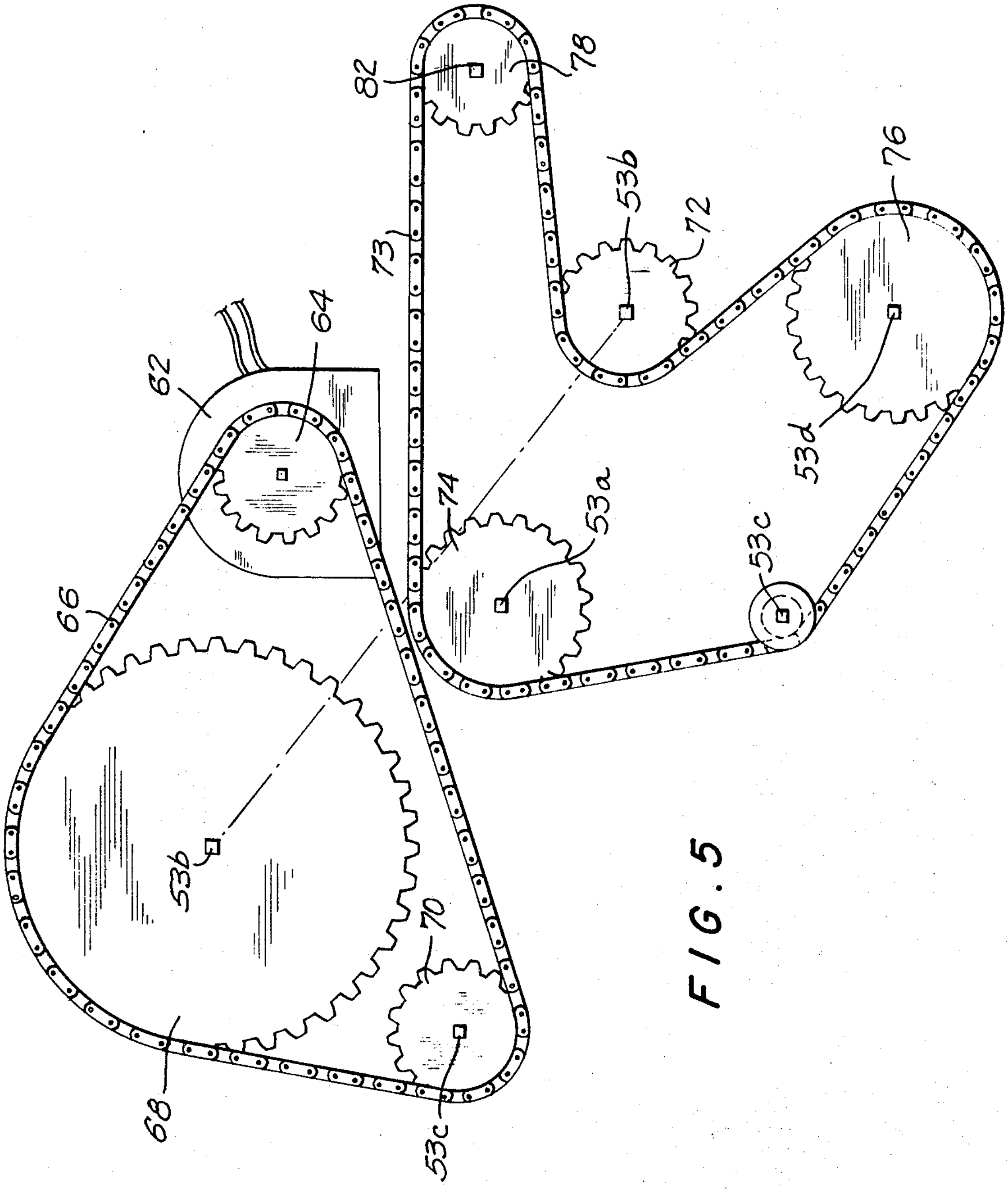
Figure 6:
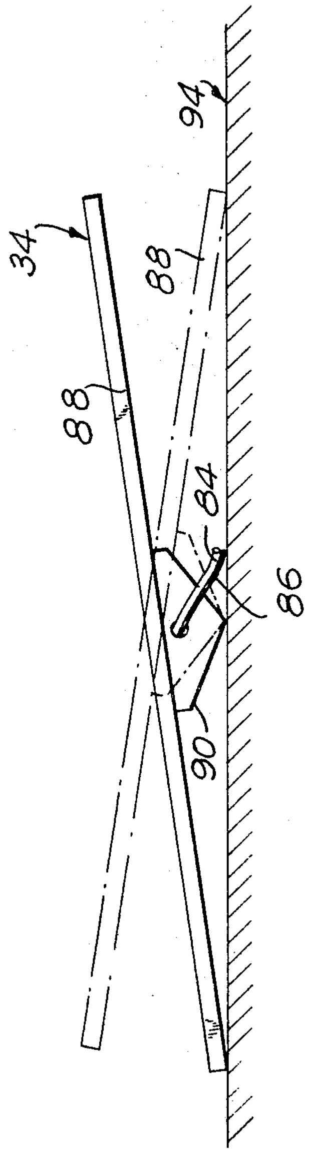
Figure 7:
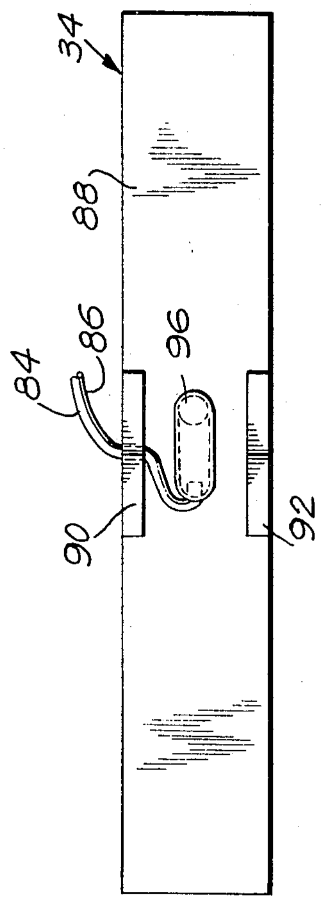
Figure 8:
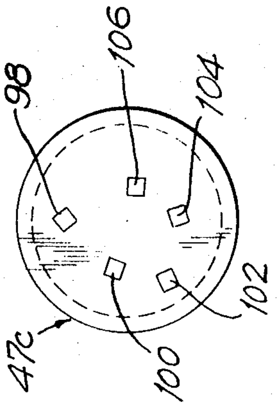
Figure 9:
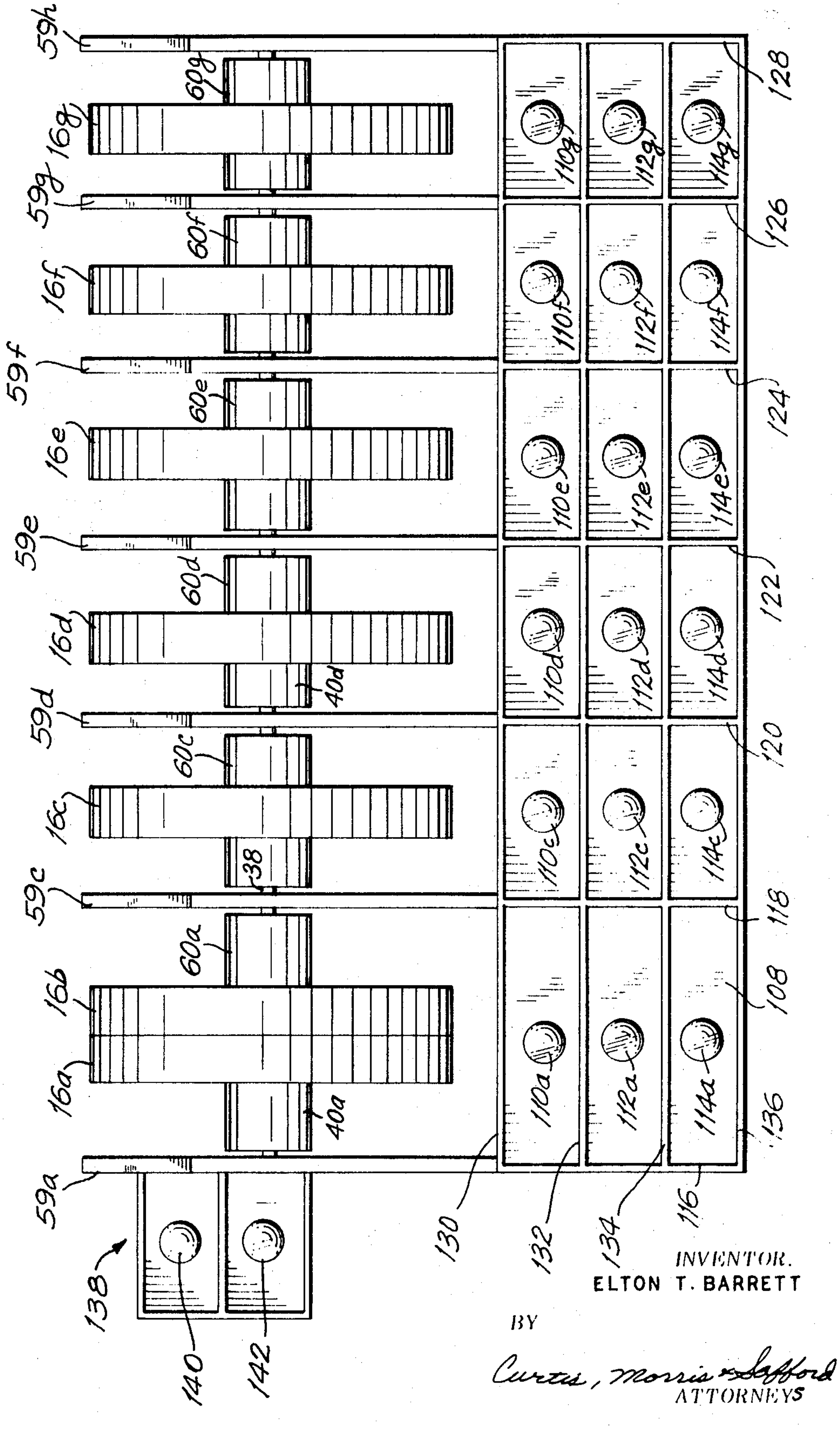
Figure 10:
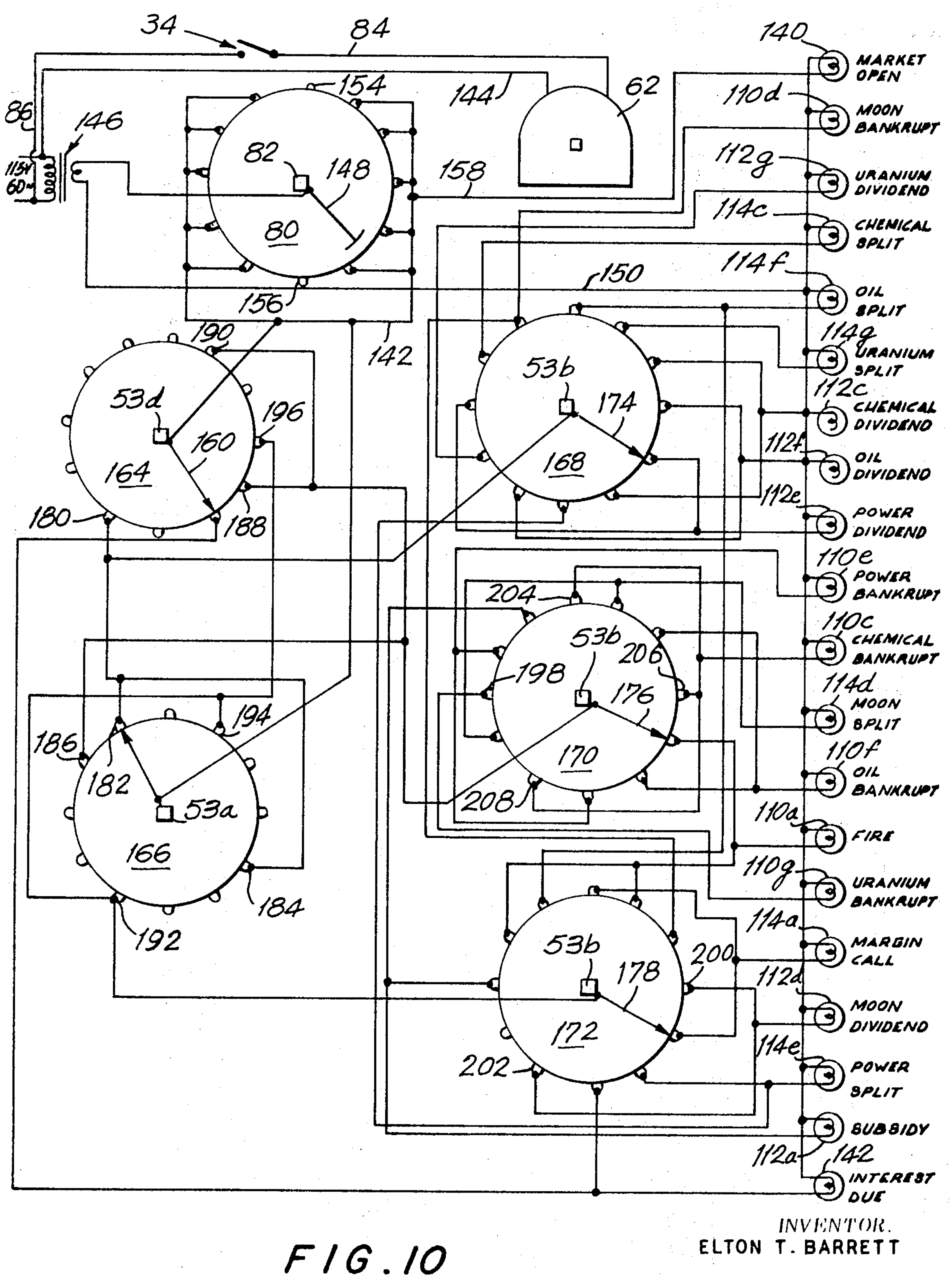

FIG. 3*a* is a similar diagrammatic section but showing an alternative spring bias for the dials;

FIG. 4 is a diagrammatic plan view showing the dial drive arrangement;

FIG. 5 illustrates diagrammatically a drive system for the cams and switches shown in FIGS. 2 and 10;

FIG. 6 is a side view of the table switch shown in FIG. 1;

FIG. 7 is a bottom view of the table switch;

FIG. 8 is a plan view of one of the cams illustrating the multiple holes for the drive shaft (so that one construction is sufficient for all of the cams, with variation achieved by different mounting);

FIG. 9 is a partial front view of the dials with the front wall removed to show the arrangement of event lamps;

FIG. 10 is a circuit diagram of electrical circuits used in the device.

With reference to the drawings the front panel 12, shown in FIG. 1, is generally opaque with transparent windows **14*a*, 14*b*, 14*c*, 14*d*, 14*e*, 14*f* and 14*g*, through which are visible numerical indications on dial faces 16*a*, 16*b*, 16*c*, 16*d*, 16*e*, 16*f* and 16*g*. Dial faces 16*c* through 16*g* represent current prices of different stocks, as shown in the drawing, the particular prices being denoted by stationary reference indicators, e.g. fixed hairlines 17 across the centers of the respective windows. The dial faces 16*a* and 16*b*** denote current prices of the two commodities, as shown.

Below each of the stock windows there are three indicators, as at 18, 20 and 22 under window **14*g*. Each of these indicators relates to the stock directly above it. Three indicators 24, 26 and 28, centered beneath the two commodity windows 14*a* and 14*b* relate to both the commodities. These indicators are transparent and capable of individual illumination to be described below. At the left are two additional indicators, 30 and 32**, respectively, "MARKET OPEN" and "INTEREST DUE," which are transparent and capable of being individually illuminated.

In operation, the indicated prices of each stock and commodity vary continually, in accordance with an individual and complex pattern. In order to stop the price variations, so that transactions can take place under fixed conditions, a table switch, generally indicated at 34, is provided. When this switch is tilted to the left as shown in FIG. 6, the game is running and the stock and commodity prices vary continually. When the table switch is thrown toward the right, the rotation of the dial faces **16*a* through 16*g* is stopped. Any indicator lights (such as those behind indicators 18, 20, 22, 24, 26, 28, 30, 32**, etc.) which are lit when the table switch is moved to its "stop" position, remain lit but the mechanism that controls the variation in the light sequence is stopped.

When playing the game each player starts with a set amount of simulated money. Any player may buy stocks or commodities at any time from a "broker" by throwing the table switch to its "stop" position and paying the indicated price plus a commission. Any player may sell at any time in a similar way. There is, however, one limitation: no transactions may take place when the "MARKET OPEN" indication 30 is dark.

The indicators below each of the stock and commodity price windows indicate an event relating to that stock or commodity. If the "BANKRUPT" indicator directly below the price quotation of any company lights up, any player may throw the table switch 34 to its "stop" position and, if the "BANKRUPT" indicator remains lit when the game is stopped, all players holding that stock must forfeit it to the "broker." If the "DIVIDEND" indicator comes on, the players holding the particular stock receive the indicated dividend from the "broker." When the "STOCK SPLIT" indicator comes on, the players holding the stock receive additional stock. When indicators under commodities denote a "50% FIRE LOSS" owners of those commodities lose one-half of their holdings or one-half of the indicated value. Upon illumination of "SUBSIDY PAYMENT," owners of commodities receive a Government payment, and when "MARGIN CALL" is illuminated players who have purchased commodities on margin are required to pay the amount of the call.

The above items of playing procedure will illustrate this particular embodiment of the invention. It is obvious that the rules, and even the nature of the game, are subject to variation.

An important aspect of the game is to provide variations in the prices of the stocks and commodities in such manner that the variations cannot be readily predicted at the same time providing control by underlying cycles which give the price variations the "feel" of actual market action. A preferred method of accomplishing this is illustrated diagrammatically in FIG. 2 in connection with dial face 16*c*.

Dial face 16*c*, which may be a paper strip suitably imprinted, is glued or otherwise secured to supporting disk 36*c* which is mounted for free rotation on a shaft 38 supported by a plurality of partitions 59*a*, 59*c*, 59*d*, 59*e*, 59*f*, 59*g* and 59*h* as shown in FIG. 9. The disks can be formed from any desired material, but I have found expanded, i.e., foamed, polystyrene to be desirable material because of its low cost and its low density which gives a desirably low moment of inertia. This foamed plastic is advantageously provided with metal bushing, 39*c*, secured to the plastic and free to rotate on shaft 38.

FIGS. 2, 3, and 4, drums 40*c* and 60*c* are shown secured to opposite sides of disk 36*c* and to the bushing 39*c*. Bushing 39*c* and its drums 40*c* and 60*c* and disk 36*c* are all freely rotatable on shaft 38. Drum 40*c* is rotated by movement of a flexible member 42*c* which is secured at its end to drum 40*c* and wrapped around it e.g., for a turn or two. The shaft 38 is spring biased (as will be described later) to rotate in the direction of the arrow 44 (see FIG. 2) and maintains flexible member 42*c* under tension. When the flexible member 42*c* is pulled in the direction of arrow 46, it tends to unwrap from drum 40*c* and rotates disk 36*c*. When the flexible member 42*c* is relaxed, the spring bias, shown in FIGS. 3 and 4, causes the disk 36*c* to rotate in the opposite direction. The flexible member 42 may be a bead chain which provides a desired tensile strength, flexibility, and durability.

The flexible member 42*c* extends as shown around grooves in the outer surfaces of four cam members 47*c*, 48*c*, 49*c* and 50*c* and is terminated at a fixed point 51*c* to a base 52.

In FIGS. 2, 4 and 5, the cam members 47 etc. are shown mounted eccentrically on and secured to one of the four square drive shafts 53*a*, 53*b*, 53*c*, 53*d*. Each drive shaft is supported, in parallel position, on a plurality of partitions 59*a*, 59*c*, 59*d*, 59*e*, 59*f*, 59*g* and 59*h*. Preferably, each of the drive shafts rotates at a different speed. For example, in one embodiment drive shaft 53*a* rotates once in 2.0 minutes, drive shaft 53*b* makes one revolution in 6.3 minutes, drive shaft 53*c* makes one revolution in 15.27 minutes and drive shaft 53*d* makes one revolution in 18.22 minutes. Whenever table switch 34 is in its "on" position, all of the drive shafts 53 are rotating and the angular position of the disk 36*c* is a function of the instantaneous positions of the four cams 47*c*, 48*c*, 49*c* and 50*c*. Each of the cams is eccentrically set on its respective shaft 53*a*, 53*b*, 53*c* and 53*d*. The amount of offset is preferably, different for each cam. The cams preferably are eccentrically placed in positions predetermined to permit disk 36*c*, to make a maximum angular movement of one revolution at least for each full cycle.

Movement of the disk 36*c*, is accomplished by distorting flexible member 42*c* from any position in which it rests between fixed point 51 around the cam member grooves, to end drum 40*c*.

In what I will term the "PRIMARY" position, the sum of the effective radii of the several cams 47, 48, 49 and 50, measured between the center of each of the shafts 53*a*, 53*b*, 53*c* and 53*d* and the points on the circumference where each cam engages the flexible member, is at a minimum. The hairline window 14*c*, will indicate one extreme end of the dial scale. As the shafts 53 rotate and the sum of the effective radii increases, the cams 47*c*, 48*c*, 49*c* and 50*c* push on the flexible member 42*c* causing it slidingly to move from the "PRIMARY" position, unwinding the required extra length from drum 40*c*. As the sum of the radii decreases the flexible member 42*c* maintained under tension by the spring bias winds onto the drum 40*c*, and the disk rotates toward the opposite end of the scale. The next effect of these opposing motions is to cause the dial to fluctuate back and forth, until at some point in the cycle all the maximum effective radii will coincide and the hairline of window 14*c* will indicate the other extreme end of the dial scale. Because the speeds of the drive shafts 53*a*, 53*b*, 53*c* and 53*d* are not integral multiples, a very long operating time may elapse before the cyclical pattern of the variation in prices is repeated. To prevent the players from learning the price patterns the actual time necessary for playing a complete game should be a small fraction of one complete pattern cycle.

In this embodiment, the flexible member 42*c* slides over the surfaces of cam members 47*c*, 48*c*, 49*c* and 50*c*. It is desirable that the coefficient of friction between the cams and the flexible members be low. Dial cord, chain or flexible metal band can be used, but I prefer to use bead chain. For example, #6 brass plated bead chain has been found entirely suitable.

Cams 47*c*, 48*c*, 49*c* and 50*c* can be formed of metal or other material but I prefer to use cams molded of a rigid plastic such as nylon, "Krylon," vinyl chloride, vinyl acetate-chloride, polycarbonate, epoxy, polyolefin, phenolic resin, polyfluoroethylenes, polyurethanes, etc.

The spring return bias for the disk 36*c* is provided, as illustrated diagrammatically in FIG. 3, by a flat coil spring 54*c* which is mounted on a spool 55, which reciprocates on shaft 56. The free end of the spring 54*c* is connected at 57 to a dial cord 58*c* which is wrapped around and secured at its end to the surface of drum 60. Drum 60 is secured to disk 36*c* and bushing 39*c*. I prefer a constant tension spring to provide the bias, for example, the type sold under the trade name "Negator," by the Hunter Spring Company.

An alternative spring return bias is shown in FIG. 3*a*. The flat coil 54*c'* is mounted at one end on spool 55' which reciprocates on shaft 56. The other end of the coil 54*c'* is wrapped around and secured to the surface of drum 60*c*. Drum 60 is secured to disk 36*c* and bushing 39*c*.

The other disks 36*a*, 36*d*, 36*f* and 36*g* (FIG. 4) are each controlled in a similar manner by a separate set of four cams. Each set of cams, however, is directly driven by the same four drive shafts 53*a*, 53*b*, 53*c* and 53*d* which extend through and are supported by partitions 59*a*, 59*c*, 59*d*, 59*e*, 59*f*, 59*g* and 59*h*. The angular positions and amount of offset of the cams along any one of the drive shafts is preferably different from the others. For example, cam 48*a* may have a large offset and cam 48*e* on the same shaft may have a small offset and at a different angle from cam 48*a*. This arrangement results in the commodities and each of the stocks having characteristics that are different from all of the others, and causes some of the stock to be increasing in price while others are decreasing. At any given moment, some stocks may be increasing in price, some decreasing, and others may be stationary as the movements of the four cams temporarily cancel the effects of each other.

In other words, the price of a stock or commodity is a function of the sum of four variables each with its own characteristic amplitude and frequency of repetition. More or less than four variables can be used, but I have found that four provide a price variation pattern sufficiently complex to defy prediction by the usual player and yet can be accomplished with a mechanism simple and economical enough to be practical.

Obviously, the number of stocks is a matter of choice and, if desired, more than one dial scale can be secured to a single disk. This has been done, in this embodiment, in connection with the two commodities. Dial faces 16*a* and 16*b* are both secured to disk 36*a*. In this case, dial faces 16*a* and 16*b* are printed in such manner that as the price of one commodity increases, the other one decreases.

FIG. 5 illustrates diagrammatically the arrangement for driving the shafts 53*a*, 53*b*, 53*c* and 53*d*. A motor 62, which may be a conventional synchronous or split-stator motor, is arranged to drive a six-tooth sprocket 64, at a speed of one r.p.m. By means of ladder chain 66, sprocket 64 drives two sprockets 68 and 70. Sprocket 68 has forty-seven teeth and is secured to square drive shaft 53*b*. Sprocket 70 has twelve teeth and is secured to square drive shaft 53*c*. Drive shaft 53*b* also extends through and is secured to a seven tooth sprocket 72 which, by means of a second ladder chain, 73, drives sprockets 74, 76 and 78. Sprocket 74 has seventeen teeth and is secured to drive shaft 53*a*. Sprocket 76 has twenty teeth and is secured to drive shaft 53*d*. Sprocket 78 has nine teeth and is provided to operate "MARKET OPEN" switch 80 (FIG. 10), through drive shaft 82.

Table switch 34 (FIGS. 1, 6, 7, and 10) is connected to the game by leads 84 and 86. The switch consists of top member 88, of wood or other suitable material, supported by two leg members 90 and 92 arranged so that when the switch is positioned on a flat surface, as at 94, top member 88 can be manually rocked ("see-sawed") from the position shown in full lines to the position shown in broken lines in FIG. 6. A small mercury switch element 96 is secured, by epoxy cement or other means, to the underside of member 88 and is connected to leads 86 and 84. These leads are arranged to disconnect the power from the motor 62 when mercury switch element 96 is open.

To simplify construction, all of the cam members, 47, 48, 49, and 50, may be identical as shown in FIG. 8 which illustrates cam 47*c*. The cam has five square transverse openings, 98, 100, 102, 104 and 106, each positioned a different distance from the center of the circular cam. Square drive shaft 53*a* may be inserted through any one of the square openings thus offering a choice of five different offsets. Moreover square shaft 53*a* may be positioned in any of four angular positions thus providing a convenient means for producing the desired angular displacements among the cams on the same shaft. After positioning the cams on each shaft they may be secured in position with a small amount of epoxy cement or other suitable means.

FIGS. 2 and 9 show the arrangement of the indicator lamps behind front panel 12. Each lamp is secured through or otherwise secured to base 108. A socket for each lamp may be provided or electrical connection to the lamp terminals made in any suitable manner. The lamps, 110*c*, *d*, *e*, *f* and *g*, are positioned directly behind the "BANKRUPT" indicators on the front panel. Lamps 112*c*, *d*, *e*, *f* and *g* are positioned directly behind the "DIVIDEND" indicators and lamps 114*c*, *d*, *e*, *f* and *g* are positioned behind the "STOCK SPLIT" indicators. Lamp 110*a* illuminates the "FIRE LOSS" indicator, lamp 112*a* the "SUBSIDY" indicator and lamp 114*a* the "MARGIN CALL" indicator. Lamps 110–114 are conventional 6.3 volt panel lamps.

To confine the light from each lamp so that it illuminates only its intended indicator, each lamp is centrally positioned within a compartment having an open face. The compartments are formed by vertical members 116, 118, 120, 122, 124, 126 and 128 and horizontal members 130, 132, 134 and 136 all secured to the base member 108. These compartments may be formed of cardboard or other suitable material. A light diffusion sheet is placed over the open face of the compartment to provide more uniform illumination of the panel indicators. A sheet of ordinary white or yellow paper is satisfactory.

A similar compartmented box 138 is provided for lamps 140 and 142 which respectively provide illumination for the "MARKET OPEN" and "INTEREST DUE" indicator.

As shown in FIG. 10, power from a conventional 115 volt, 60 cycle source is connected by leads 86 and 84 and lead 144 through table switch 34 to drive motor 62. The power source is also connected to the primary of transformer 146 which reduces the line voltage of about five volts. One end of the secondary winding of this transformer is connected to a common terminal of all of the indicator lamps. The other end of the secondary winding is connected to a make-before-break rotor 148 of the rotary switch 80. Switch 80 is provided with twelve fixed contacts, all of which are connected together by a lead 152, except for contacts 154 and 156. The rotor 148 is secured to the shaft 82 which is rotated by sprocket 78 (FIG. 5).

Common lead 152 is connected by lead 158 to the "MARKET OPEN" lamp 140. Thus the "MARKET OPEN" indicator is turned off twice during each revolution of shaft 82. All indicator lamps are fed from one side of transformer 146 through arm 148 and line 158 controlled by switch 80 to common lead 152 and from the other side of transformer 146 through common lead 150. Thus when switch 80 shuts the "MARKET OPEN" lamp 140 off all of the other indicator lamps are also shut off.

Common lead 152 is connected to the rotors 160 and 162 of two twelve position rotary switches 164 and 166, respectively. These switches are of the break-before-make type. Rotor 160 of switch 164 is connected to and rotated by drive shaft 53*d*, and rotor 162 of the switch 166 is connected to and rotated by drive shaft 53*a*.

Switches 164 and 166 serve as primary switches to feed power to three distribution switches 168, 170 and 172, which are identical in construction with switches 164 and 166. Rotors 174, 176 and 178 are connected to and rotated by drive shaft 53*b*.

Rotor 174 of switch 168 is connected to contact 180 of switch 164 and to contacts 182 and 184 of switch 166. Rotor 176 of switch 170 is connected to contact 186 of switch 166 and contacts 188 and 190 of switch 164. Rotor 178 of switch 172 is connected to contacts 192 and 194 of switch 166 and contact 196 of switch 164.

The remainder of the circuitry will be illustrated by the circuits operating each of the indicator lamps, "CHEMICAL BANKRUPT" 110*c*, "MOON DIVIDEND" 112*d* and "URANIUM BANKRUPT" 110*g*. Operation of the other lamps will then be apparent from the circuit diagram, FIG. 10.

The "URANIUM BANKRUPT" indicator lamp 110*g* is connected to contact 198 of switch 170. "MOON DIVIDEND" indicator lamp 112*d* is connected to contacts 200 and 202 of switch 172. "CHEMICAL BANKRUPT" indicator lamp 110*c* is connected to contacts 204, 206 and 208 of switch 170. Thus, "URANIUM BANKRUPT" indicator 110*g* can be energized through the following three circuits with contact connections: 186 and 198; 188 and 198; and 190 and 198. The "MOON DIVIDEND" indicator 112*d* can be energized through six circuits with contact connections: 192 and 200; 192 and 202; 194 and 200; 194 and 202; 196 and 200; and 196 and 202. The "CHEMICAL BANKRUPT" indicator lamp 110*c* can be energized through nine circuits with contact connections: 186 and 204; 186 and 206; 186 and 208; 188 and 204; 188 and 206; 188 and 208; 190 and 204; 190 and 206; and 190 and 208.

This arrangement provides a wide degree of irregularity in the time lapse between successive energizations of each of the indicator lamps, so that it is impossible for a player to predict when the next lamp will light. Because the switches are operated by the same drive shafts that operate the price-controlling cams, it is possible to coordinate events with price indications. For example, cam 48*g* (which is one of the cams controlling the price of "URANIUM STOCK") can be angularly positioned on shaft 53*b* for minimum price, or preferably nearly minimum price, when rotor 176 engages contact 198. Cam 47*g* can be similarly positioned for near minimum price when rotor 162 engages contact 186. While "URANIUM" does not "go bankrupt" at any particular price, the "chance of bankruptcy" increases when the price is low and decreases when it is high. In a similar manner, the indicators can be arranged to "declare" most dividends when the prices are high.

From the foregoing it will be seen that this game mechanism provides a large number of variables, and a long term pattern cycle giving the game different playing characteristics each time it is played. Thus, it has the advantage of constantly offering a new challenge to the players without becoming predictable and boring.

The invention has been described hereinabove in a preferred embodiment, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

I claim:

1. In a game, the combination comprising a movable indicator having a plurality of indicia thereon, a stationary indicator adapted to indicate one of said indicia, a plurality of rotatable effectively dissimilar cams, drive means arranged to drive simultaneously said rotatable cams, means coupled to said rotatable cams arranged to combine their respective rotary motions into a complexly varied composite movement, and means operatively connecting said last means to said movable indicator to give motion to said movable indicator to bring said indicia thereon into designating relation to said stationary indicator in a complexly fluctuating manner.

2. In a game, the combination comprising a movable indicator having a plurality of indicia thereon, a stationary indicator, a plurality of cyclically rotatable members which are cams mounted on cyclically rotatable shafts, said cams being eccentrically mounted, each cam having a varying amplitude of eccentricity, drive means arranged to drive simultaneously each of said cyclically rotatable members, means coupled to said cyclically rotatable members arranged to produce a composite movement whose motion is a function of the combined motion of said cyclically rotatable members, and means operatively connecting said last means to said movable indicator whereby upon movement of said movable indicator selected indicia thereon will be denoted by said stationary indicator.

3. A game as claimed in claim 2 wherein said drive means includes means for driving the cyclically rotatable members at different frequencies of repetition, respectively.

4. A game as claimed in claim 3 wherein the coupling means is a flexible tensile member anchored at one point to a frame and extending from said anchored point back and forth and around a plurality of said cams and means for maintaining said flexible member under tension, whereby, a pull on said tensile member is transmitted to said cams and converted into torque.

5. A game as claimed in claim 4 in which the rotatable members are in staggered arrangement, the flexible tensile member is anchored at one end to pass from the anchored end over one side of the periphery of each successive eccentric cam and thence to the next cam, back and forth; arranged to rotate at a different speed from the others, the several cams being differently oriented with respect to their maximum radii, whereby a pull on the flexible member will tend to rotate all said cams, and will cause unobvious variations in the engaged length of said flexible member, and therefore in the rotation of the cams, respectively, said cams being arranged respectively to rotate at respectively different speeds, whereby the points on the cams where pull is exerted by the flexible member shift and the radii of the cams to said points respectively from their axes are alternatively extended and retracted and said flexible tensile members are sometimes freed for extension by, and sometimes pulled up taut by such shifts in the cams over which the flexible member passes, so that the flexible member, when shifted by said cams, exerts a variable pull or release on the movable indicator, to turn it from its then position when the sum of said shifts is positive to take up slack and pull the flexible member into tight engagement with the cams and then rotate the cams; and, when the sum of the shifts is negative, to provide slack which relieves its engagement of the cams while pulling the flexible members back.

References Cited

UNITED STATES PATENTS

| | | |
|---|---|---|
| 689,365 | 12/1901 | McMullen. |
| 2,545,644 | 3/1951 | Benton et al. |
| 3,370,854 | 2/1968 | Washburn. |

FOREIGN PATENTS

| | | |
|---|---|---|
| 586,521 | 12/1958 | Italy. |

ANTON O. OECHSLE, Primary Examiner

A. W. KRAMER, Assistant Examiner